United States Patent [19]

Kinch et al.

[11] Patent Number: 4,757,670
[45] Date of Patent: Jul. 19, 1988

[54] AGRICULTURAL CROP DEFOLIATOR

[76] Inventors: Phillip Kinch, 815 - 24th St. North, Lethbridge, Alberta T1H 3V3; Casey Gouw, Box 1667, Taber, Alberta, both of Canada

[21] Appl. No.: 854,225

[22] Filed: Apr. 21, 1986

[51] Int. Cl.[4] .......................................... A01D 23/02
[52] U.S. Cl. .................................... 56/13.1; 56/121.42
[58] Field of Search ...................... 56/12.9, 13.1, 13.2, 56/14.3, 121.42, 503, 500, 208, 15.9, 12.8

[56] References Cited

U.S. PATENT DOCUMENTS

| | | | |
|---|---|---|---|
| 3,174,265 | 3/1965 | Capps | 56/13.1 |
| 3,178,873 | 4/1965 | Meyer | 56/DIG. 8 X |
| 3,183,654 | 5/1965 | Jordan et al. | 56/28 |
| 3,349,747 | 10/1967 | Vande Wiele | 56/208 X |
| 3,521,438 | 7/1970 | Adrian | 56/330 |
| 3,601,964 | 8/1971 | Fisher | 56/330 |
| 3,964,245 | 6/1976 | Hecht | 56/331 |
| 4,397,136 | 8/1983 | McLeod | 56/500 |

FOREIGN PATENT DOCUMENTS 58116 9/1953 France .......................... 56/121.42

Primary Examiner—Stephen J. Novosad
Assistant Examiner—David J. Bagnell
Attorney, Agent, or Firm—George H. Dunsmuir

[57] ABSTRACT

The leaves and stalks of plants have previously been topped using pick-up fingers for raising the leaves and stalks to an elevated more or less vertical position, and blades for cutting the thus elevated plant tops. The plant tops can be elevated more effectively by blowing air against the leaves and stalks simultaneously from opposite sides thereof. A cutter is provided at the trailing end of the streams of air.

14 Claims, 3 Drawing Sheets

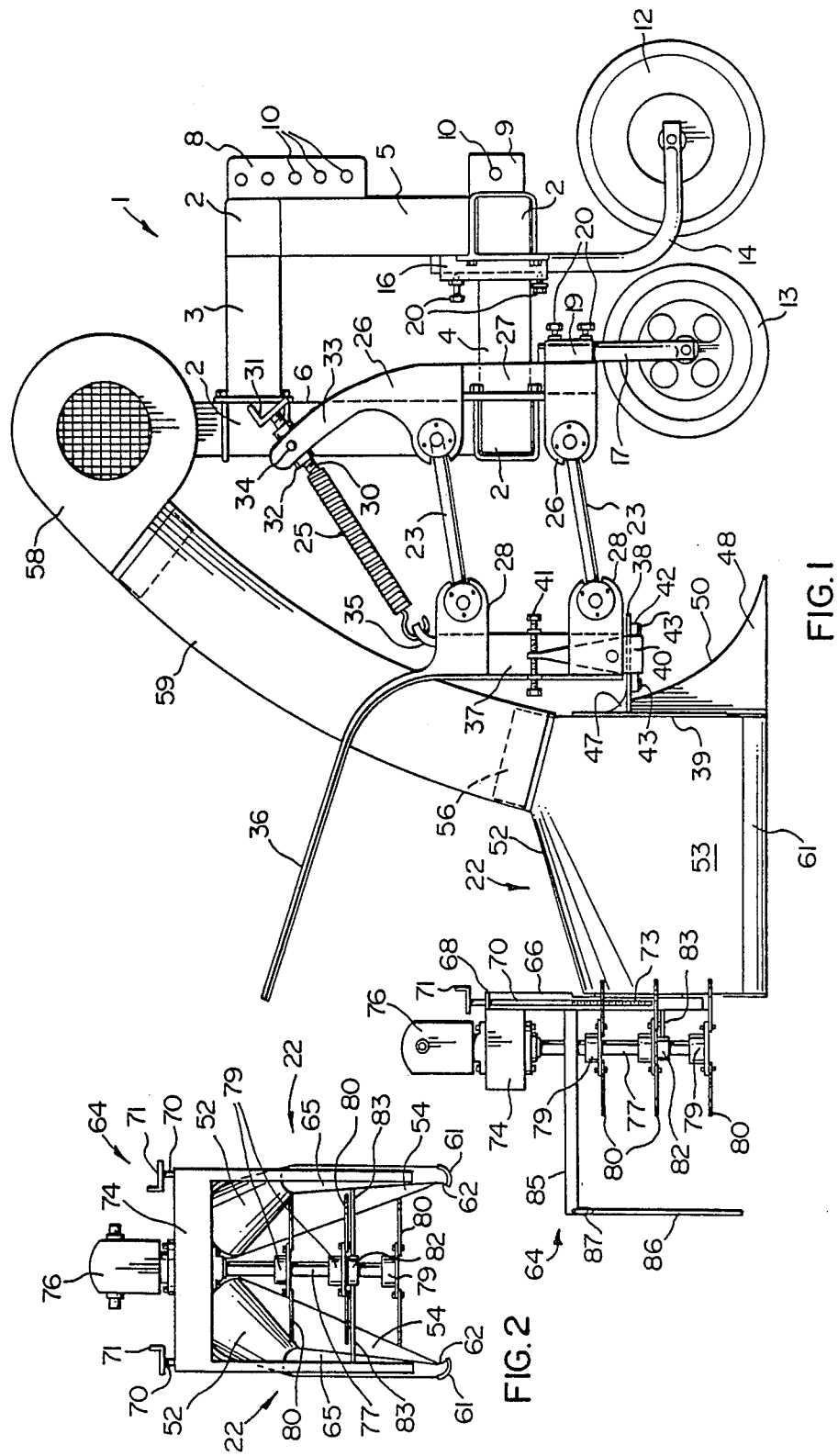

4,757,670

AGRICULTURAL CROP DEFOLIATOR

BACKGROUND OF THE INVENTION

This invention relates to an apparatus and method for removing the tops of plants and in particular to an apparatus for lifting and cutting the tops of plants.

While the apparatus and method of the present invention are primarily designed for removing the tops of onion plants, it will be appreciated that such apparatus and method can be used for cutting other plants, such as beets.

More often than not the stalks and leaves of onion plants are found to be bent prior to harvesting. It is necessary to top the onions i.e. remove the stalks and leaves prior to harvesting of the roots or bulbs of the onions. Moreover it has been found that the leaves of onions tend to hide the stalks and/or bulbs and as a result there are crop losses of up to forty percent. The losses result when the harvester cuts the stalks into small pieces or damages the bulbs. Accordingly it is important that the tops of the onions be removed before harvesting of the bulbs. A typical apparatus for performing such an operation is described in U.S. Pat. No. 4,141,201 which issued to L. H. Christensen on 27 Feb. 1979. Such mechanical devices are somewhat complicated and do not necessarily pick up all of the tops during a single passage over a crop area.

The object of the present invention is to overcome the drawbacks of existing structures, by providing a relatively simple apparatus and method for efficiently removing the tops of plants.

SUMMARY OF THE INVENTION

Accordingly the present invention relates to an apparatus for removing the top of a plant, comprising casing means, including a pair of downwardly extending hollow arm means for bordering a plant during use; inlet means for introducing air under pressure into each said arm means; opposed discharge means at the bottom inner ends of said arm means for discharging air substantially horizontally against opposite sides of the plant to elevate the top of the plant; and cutter means for cutting the plant top while in the elevated position.

The invention also relates to a method of removing the top of a plant, comprising the steps of directing substantially horizontal streams of air simultaneously against opposite sides of the plant to elevate the plant top; and while the top is in said elevated position, cutting the top of the plant close to the bottom thereof.

BRIEF DESCRIPTION OF THE DRAWINGS

The invention will now be described in greater detail with reference to the accompanying drawings which illustrates a preferred embodiment of the invention and wherein:

FIG. 1 is a schematic, partly sectioned, side elevation view of an apparatus for removing the tops of plants in accordance with the present invention;

FIG. 2 is an end view of a portion of the apparatus of FIG. 1 as seen from the left of FIG. 1 with parts removed;

DESCRIPTION OF THE PREFERRED EMBODIMENT(s)

Figure 5:
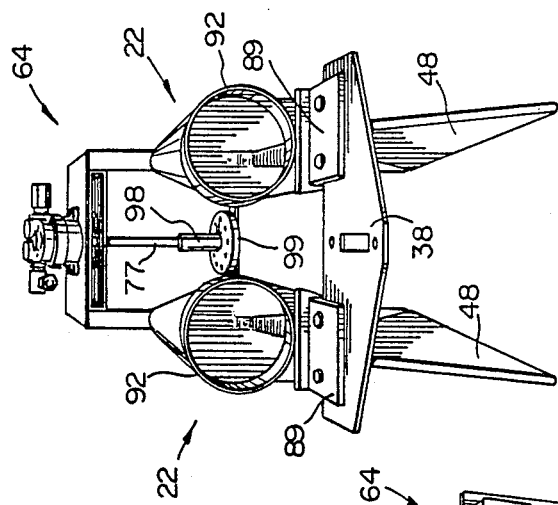
FIG. 5 is a perspective view from above of the other end of the apparatus of FIG. 3.

With reference to FIGS. 1 and 2, the apparatus of the present invention is intended for towing behind a tractor or other vehicle (not shown) and for such purpose includes a generally rectangular main frame generally indicated at 1. The frame 1 is defied by longitudinally extending bars 2, top and bottom crossbars 3 and 4 respectively, and front and rear posts 5 and 6 respectively. It will be appreciated that the frame 1 extends longitudinally into the plane of the paper (FIG. 1) and would carry a plurality of the elements described hereinafter. Plates 8 and 9 with holes 10 therein are provided on the front of the frame 1 for connecting the latter to a towing vehicle. The frame 1 is carried by vertically adjustable front and rear wheels 12 and 13 respectively (one of each shown). The front wheels 12 are mounted on the bottom end of generally L-shaped arms 14, which are adjustably mounted in sleeves 16 of the frame 1. Similarly the rear wheels 13 are mounted on the bottom ends of straight arms 17, which are slidably mounted in sleeves 19 on the rear of the frame 1. The arms 14 and 17 are locked in position by bolts 20.

Casings generally indicated at 22 are pivotally connected to the frame 1 by a pair of arms 23 and by a helical spring 25. The leading ends of the arms are connected to brackets 26 on posts 27 on the rear of the frame 1 and the trailing ends of the arms 23 are connected to brackets 28 on an intermediate frame.

The spring 25 is connected to one end of a threaded rod 30 which extends from an angle iron 31 on the top end of the frame 1, through an internally threaded sleeve 32 at the bifurcated top end 33 of the bracket 26, so that the tension on the spring can be adjusted. The sleeve 32 is pivotally connected to the arms of the top end 33 of the bracket 26 by a pin 34. The other end of the spring 25 is connected to a lug 35 on the top of the intermediate frame. An inclined deflector arm 36 extends upwardly and rearwardly from the top end of the intermediate frame.

The intermediate frame includes a central, rectangular cross section vertical tube 37 to which the brackets 28 and the deflector arm 36 are welded. The tube 37 is placed on a horizontal plate 38 extending forwardly from a vertical plate 39 on the closed leading ends of the casings 22. A wedge 40 extends downwardly from within the tube 37 through a hole (not shown) in the plate 38. The wedge 40 is connected to the tube 32 by a bolt 41. A pin 42 extends through the bottom end of the wedge 40 for retaining the frame 29 on the plate 39. The ends of the pin 42 are flattened for receiving bolts 43 for connecting the pin to the plate 39. Thus the casings 22 can be rotated laterally with respect to the towing vehicle during travel over rough terrain.

Gussets 47 (one shown) reinforce the connection between the plates 38 and 39. Metal wedges 48 extend forwardly from the leading ends of the casing 22 at the ends of the plate 39. The wedges 48 have inclined, concave front edges 50.

Each of the casings 22 is in the form of an elongated hollow trapezoid with a semi-conical top end 52 which tapers rearwardly and planar downwardly converging side walls 53 and 54. A cylindrical inlet duct 56 is provided on the top front end of each casing 22. Air under pressure is fed from a blower 58 on the top of the frame 1 through flexible ducts 59 (one shown) and the inlet ducts 56 into the casings 22. An arcuate slide plate 61 extends downwardly and inwardly from the bottom end of each outer side wall 53 of the casing 22 so that the free end of the plate 61 and the bottom edge of the inner side wall 54 define an elongated air outlet 62.

A rear frame generally indicated at 64 is mounted on the closed trailing ends 65 of the casings 22. The frame 64 is generally rectangular with an open bottom end, and includes a pair of front side posts 66 (one shown) with outwardly extending flanges 68 at the top ends thereof. Rods 70 with handles 71 at the top ends and threaded bottom ends 73 extend through the flanges 68 to brackets (not shown) on the rear ends of the casings 22 so that the height of the casings 22 can be adjusted. A ledge 74 extends rearwardly from the top ends of the posts 66 for supporting a hydraulic motor 76. A shaft 77 extends downwardly from the motor 76 through the ledge 74 of the frame 64. Sleeves 79 carrying blades 80 are mounted on the shaft 77 at three spaced apart locations. The shaft 77 is stabilized by a bearing containing sleeve 82 and a pair of arms 83 extending rearwardly and inwardly from the front posts 66 to the sleeve 82. A pair of side bars 85 extend rearwardly from the posts 66 and carry downwardly extending bars 86 at their rear free ends, for limiting downward movement of the rear end of the frame 64 i.e. for preventing damage to the blades 80.

In the following description of FIGS. 3 to 5 wherever possible the same reference numerals have been used to identify elements the same or similar to elements in FIGS. 1 and 2.

Figure 4:
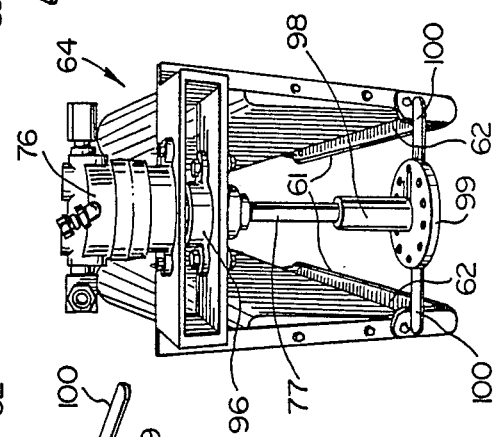
FIG. 4 is a perspective view from above of one end of the apparatus of FIG. 3.
Figure 3:
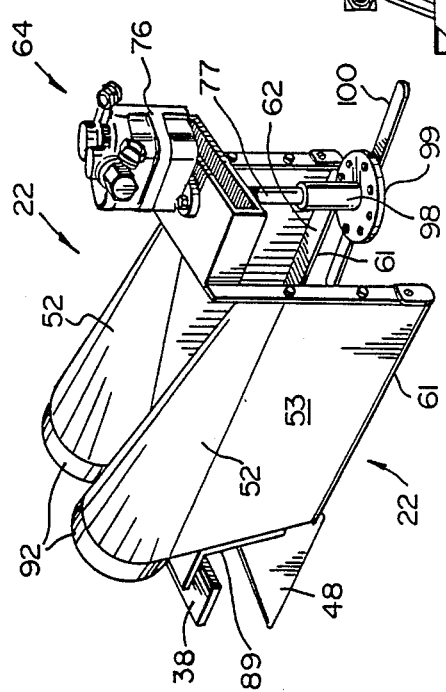
FIG. 3 is a perspective view from above and one end of a second embodiment of the apparatus of the present invention.

In the apparatus of FIGS. 3 to 5 a pair of inverted L-shaped plates 89 are connected to the closed leading ends of the casings 22. The upper, horizontal arms of the plates 89 are connected to the generally pentagonal plate 38 which can be connected directly to the intermediate frame. The inlet ducts 92 on the casings 22 are located in the leading ends of the casings 22, which means that the air must be diverted downwardly to exit through the outlets 62.

The trailing frame 64 is defined by a pair of side bars 93 connected to the trailing ends of the casings 22 and a rearwardly extending, hollow rectangular table 95, carrying the hydraulic motor 76. The shaft 77 is stabilized by a sleeve 96 mounted on the lower level of the table 95. The shaft 77 carries a single sleeve 98 with a disc 99 and an elongated blade 100 at the bottom thereof. It will be appreciated that the casings 22 can readily be replaced by a single casing having an inlet manifold at one end for directing the incoming air to two arms resembling the casings 22.

During use the front end of the main frame 1 of the apparatus is connected to a towing vehicle (not shown). The apparatus is dragged over the ground so that the plates 61 slide along the ground. Rather than building up in front of the flat front ends of the casing 22, soil is deflected by the wedges 48. If during travel of the apparatus across the ground a rock or other obstacle is encountered, the apparatus of FIGS. 1 and 2 i.e. the intermediate frame, the casings 22 and the rear frame 64 rotate around the horizontal axes of the brackets 26. Upward movement of the casings 22 is limited by the arms 36. By turning the handles 71 the height of the blades 80 can be adjusted.

Figure 7:
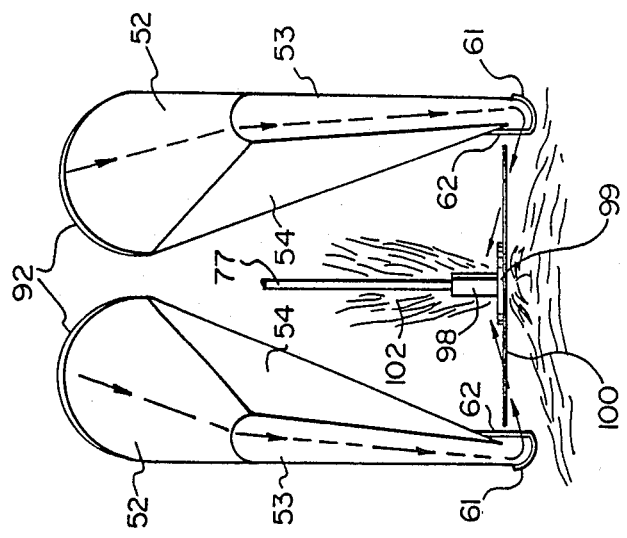
FIGS. 6 and 7 are schematic front and rear views respectively of portions of the apparatus of FIGS. 3 to 5, illustrating the method of the present invention.
Figure 6:
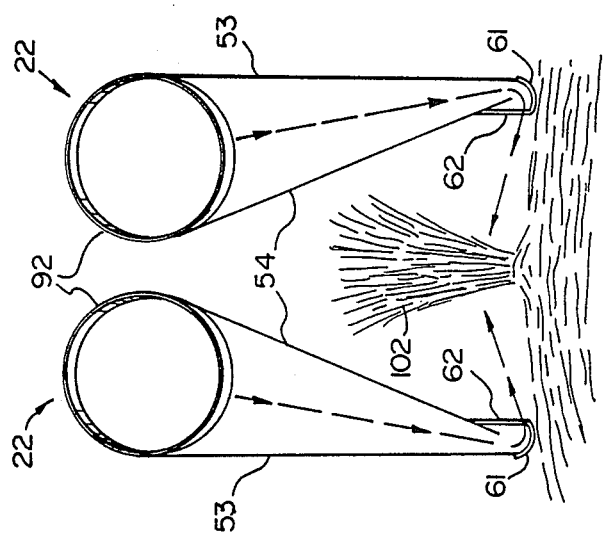

Referring to FIGS. 6 and 7, with the blower 58 in operation air under pressure is blown through the flexible ducts 59 into the casings 22. The air moves downwardly and is discharged horizontally and slightly upwardly through the outlets 62. Thus the air is blown against the opposite sides of a plant 102 to cause the leaves and stalks thereof to be elevated i.e. to stand (FIG. 6). The air is blown against the plant 102 near the bottom thereof i.e. immediately above ground level. With the leaves and stalks of the plant 102 in the elevated position the rotating blade 100 cuts the leaves near the ground. The leaves and stalks can be removed, leaving the roots or bulbs of the plants 102 clearly visible for harvesting. It will be noted that during rotation the blades 80 (FIGS. 1 and 2) or 100 (FIGS. 3 to 5) extend a short distance into the normal flow path of the air discharged through the outlets 62. This ensures that the leaves and stalks of the plant 102 are in the elevated position (FIGS. 6 and 7) during cutting.

What we claim is:

1. An apparatus for removing the top of a plant, comprising casing means including a pair of downwardly extending hollow arm means having ground engaging slide plates along their lower edges for bordering a plant during use; inlet means for introducing air under pressure into each said arm means; opposed discharge means at the bottom inner ends of said arm means for discharging air substantially horizontally against opposite sides of the plant to elevate the top of the plant; and rotary cutter means for cutting the plant top while in the elevated position.

2. An apparatus according to claim 1 wherein said casing means includes a pair of separate, generally parallel casings; inlet means in each said casing for introducing air under pressure into the top thereof; and discharge means in each said casing for discharging air into its arm means and thence substantially horizontally towards the bottom end of the other casing.

3. An apparatus according to claim 2 wherein each said casing includes a hollow, substantially conical top end; side walls extending downwardly from said top end and forming said arm means; arcuate deflector means on the bottom end of each outer side wall for defining said discharge means with the bottom end of each inner side wall; and end plates closing the ends of the casing.

4. An apparatus according to claim 1 including wedge means on the front end of each said arm means for deflecting soil as the casing is moved along the ground.

5. An apparatus according to claim 1 including first frame means connected to the rear end of said casing means and carrying said cutter means.

6. An apparatus according to claim 5 wherein said cutter means includes blade means extending into the path of air discharged from said discharge means for ensuring that the plant is cut while in the elevated position.

7. An apparatus according to claim 6 wherein said cutter means includes motor means on said first frame means and shaft means extending downwardly from said frame means carrying said blade means.

8. An apparatus according to claim 7 including adjuster means for varying the height of said blade means relative to ground level.

9. An apparatus according to claim 7 wherein said cutter means includes a plurality of blades at different levels on said shaft means.

10. An apparatus according to claim 8 wherein said cutter means includes a plurality of blades at different levels on said shaft means.

11. An apparatus according to claim 1 including coupling means for pivotally connecting said casing means to a towing vehicle whereby the casing means can be deflected around obstacles in or on the soil.

12. An apparatus according to claim 11 wherein said coupling means includes tow frame means for connecting to a towing vehicle; and arm means pivotally connecting said casing means to said tow frame means.

13. An apparatus according to claim 12 including spring means interconnecting said tow frame means and casing means above said arm means effectively to provide a floating connection between the tow frame means and the casing means.

14. An apparatus according to claim 12 including pivot means connecting said casing means to said tow frame means, whereby said casing means can be rotated laterally with respect to the towing vehicle during travel over uneven terrain.

* * * * *